(12) United States Patent
Happ et al.

(10) Patent No.: US 9,545,822 B2
(45) Date of Patent: Jan. 17, 2017

(54) WHEEL BEARING UNIT HAVING A CLOSABLE COVER

(71) Applicant: Schaeffler Technologies AG & Co. KG, Herzogenaurach (DE)

(72) Inventors: Alexander Happ, Hofheim (DE); Wilhelm Walter, Dittelbrunn (DE)

(73) Assignee: Schaeffler Techologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/653,552

(22) PCT Filed: Oct. 30, 2013

(86) PCT No.: PCT/DE2013/200261
§ 371 (c)(1),
(2) Date: Jun. 18, 2015

(87) PCT Pub. No.: WO2014/094750
PCT Pub. Date: Jun. 26, 2014

(65) Prior Publication Data
US 2016/0193873 A1 Jul. 7, 2016

(30) Foreign Application Priority Data
Dec. 20, 2012 (DE) .......................... 10 2012 223 880

(51) Int. Cl.
*F16C 33/80* (2006.01)
*F16C 35/04* (2006.01)
(Continued)

(52) U.S. Cl.
CPC ....... *B60B 27/0073* (2013.01); *B60B 27/0005* (2013.01); *F16C 33/805* (2013.01);
(Continued)

(58) Field of Classification Search
CPC . F16C 33/805; F16C 2326/02; F16C 33/7886; F16C 33/80; F16C 33/7876; F16C 35/00; F16C 35/067; F16C 43/04; B60B 27/0005; B60B 27/001; B60B 27/0073
(Continued)

(56) References Cited

U.S. PATENT DOCUMENTS 4,372,628 A * 2/1983 Kiener ................ B60B 27/0005
384/476
4,545,692 A * 10/1985 Bras .................... B60B 27/0005
384/477
(Continued)

FOREIGN PATENT DOCUMENTS

CN 100420869 9/2008
CN 101512170 8/2009
(Continued)

*Primary Examiner* — Phillip A Johnson
(74) *Attorney, Agent, or Firm* — Volpe and Koenig, P.C.

(57) ABSTRACT

In summary, provided is a wheel bearing unit having a cover element which can be used as a pre-seal to a main seal and encloses the fastening elements of the wheel flange. The outstanding sealing effect has been favored in the past, however a disadvantage in terms of assembly and dismantling is produced which the invention seeks to eliminate. Therefore one or more openings are provided which are formed in the cover. The opening or openings enable the simple dismantling or assembly of the fastening elements on the wheel flange and can advantageously also be closed, such that both the sealing effect and an easy dismantling or assembly are possible.

6 Claims, 2 Drawing Sheets

(51) Int. Cl.
*F16C 43/04* (2006.01)
*B60B 27/00* (2006.01)
*F16C 33/78* (2006.01)
*F16C 19/18* (2006.01)

(52) U.S. Cl.
CPC ........ *F16C 19/184* (2013.01); *F16C 33/7876* (2013.01); *F16C 2326/02* (2013.01)

(58) Field of Classification Search
USPC .............. 384/477, 478, 484, 488, 510, 544, 559,384/589
See application file for complete search history.

(56) References Cited

U.S. PATENT DOCUMENTS

| | | | |
|---|---|---|---|
| 4,647,230 A | 3/1987 | Friedrich et al. | |
| 4,808,809 A * | 2/1989 | Hayakawa | G01V 8/12 250/205 |
| 7,393,140 B2 * | 7/2008 | Norimatsu | F16C 19/386 384/448 |
| 7,604,416 B2 | 10/2009 | Niebling et al. | |
| 7,708,353 B2 * | 5/2010 | Inoue | B60B 27/00 188/17 |
| 7,832,942 B2 | 11/2010 | Komori et al. | |
| 8,500,338 B2 * | 8/2013 | Walter | F16C 33/805 384/488 |
| 2008/0199120 A1 | 8/2008 | Torii et al. | |
| 2011/0182538 A1 | 7/2011 | Langer et al. | |

FOREIGN PATENT DOCUMENTS

| | | |
|---|---|---|
| DE | 3421188 | 12/1985 |
| DE | 102008051065 | 4/2010 |
| JP | 2006132618 | 5/2006 |
| WO | 2008126791 | 10/2008 |

* cited by examiner

WHEEL BEARING UNIT HAVING A CLOSABLE COVER

BACKGROUND

The invention relates to a wheel bearing unit with a wheel hub having a wheel flange with a cover provided for covering a side of the wheel flange facing away from the wheel, wherein the cover is fixed directly or indirectly on the outer ring and forms, together with the wheel flange, a labyrinth seal.

Such wheel bearing units were previously used to prevent disadvantageous effects of spray water on the seals of the wheel bearing unit. The cover can be mounted on a stationary outer ring of the wheel bearing and cover the wheel flange axially, wherein a labyrinth seal can be provided radially on the outside. In this way, the cover acts in combination with the surface of the wheel flange or with a labyrinth seal like a pre-seal that is mounted in front of the actual seal of the wheel bearing. The actual seal, also called main seal below, can be made from a cartridge seal and/or can have a sealing lip, wherein the sealing lip is in rubbing sealing contact. As an alternative to the cartridge seal, a carrier with a radial or axial sealing lip could also be provided.

From DE 10 2008 051 065 A1, a cover for a wheel bearing unit is disclosed that has a cylindrical fastening area, with which this can be mounted on the outer ring of the wheel bearing unit and partially forms, radially outside with a cylindrical projection, a labyrinth seal that is formed with a radial end of the wheel flange.

In this way, spray water is very effectively kept away from the vehicle-side inner side of the wheel flange, with which the main seal is exposed to significantly less spray way and foreign particles due to the pre-seal compared with conventional wheel bearing units. It is especially advantageous if the mentioned labyrinth seal is also partially formed by the brake arrangement.

Due to the ring-shaped construction of the cover, after the installation of the wheel bearing unit it is not possible to remove or insert bolts that are provided for fastening the rim from the flange or into the flange on the vehicle side, because this side of the wheel flange is covered by the cover and is thus not accessible.

Disassembly is also extremely problematic; in particular, for disassembly the wheel bearing must also be removed only to remove the cover. Because the separation of the wheel hub with the flange from the stationary part always involves the rolling space with the rolling bodies, this undertaking represents a disproportionately large expense.

SUMMARY

The invention is based on the object of improving the removal properties and installation properties without affecting the advantageous sealing properties of the cover.

This objective is achieved in a wheel bearing unit of the type noted above such that the cover has at least one opening through which the wheel bolts can be guided for installation on or removal from the wheel flange through the cover.

Here it is advantageous that the opening used for guiding the bolts through can be placed such that it is exposed to no or only little spray water and thus the sealing effect of the cover is degraded not at all or only very slightly. In addition, for the removal of a plurality of bolts or similar fasteners, such as screws or the like, only one opening is required. This is because, for the installation or removal, the wheel flange can always be positioned so that the fastener to be removed from the wheel flange is aligned with the opening and can be removed through the opening. During installation, after placement of the fastener through the opening on the wheel flange, the wheel flange can be moved to the next position, in order to fasten the next fastener.

In one advantageous embodiment, the opening can be closed, in particular, sealed, by means of a cover element. A cover element here could be a plug or cap or the like, which closes the opening with respect to spray water and other foreign particles. Because this is a static (not rubbing) seal, the requirements on the cover element are relatively low. For the sake of simplicity, a round or cylindrical shape of the cover element is the simplest to realize, but in principle other shapes are also conceivable to be able to be adapted optimally to the opening at the respective position or in the respective application.

Advantageously, the labyrinth seal forms a pre-seal to another seal, in particular, main seal, with at least one rubbing contact sealing lip. This rubbing contact sealing lip can be an axial sealing lip or a radial sealing lip, wherein the radial sealing lip exhibits a higher sealing capability. The sealing properties required for a wheel bearing usually imply at least one rubbing contact sealing lip. Advantageously, the service life of this sealing lip is prolonged decisively by the mentioned pre-seal, so that also the service life of the wheel bearing is improved.

In one advantageous embodiment, the cover element can have a one-part, two-part, or also multiple-part design. This multiple-part design can imply a fastening mechanism or result in simple installability of the cover element.

Obviously, several openings that can be covered or sealed can also be formed on the cover element, in order to prevent the turning of the wheel flange for installation or removal. This can be useful for automated use of the invention.

Other advantageous constructions and preferred refinements of the invention can be found in the description of the figures and/or the dependent claims.

The invention is described and explained in more detail with reference to embodiments shown in the figures.

BRIEF DESCRIPTION OF THE DRAWINGS

Shown are.

DETAILED DESCRIPTION OF THE PREFERRED EMBODIMENTS

Figure 1:
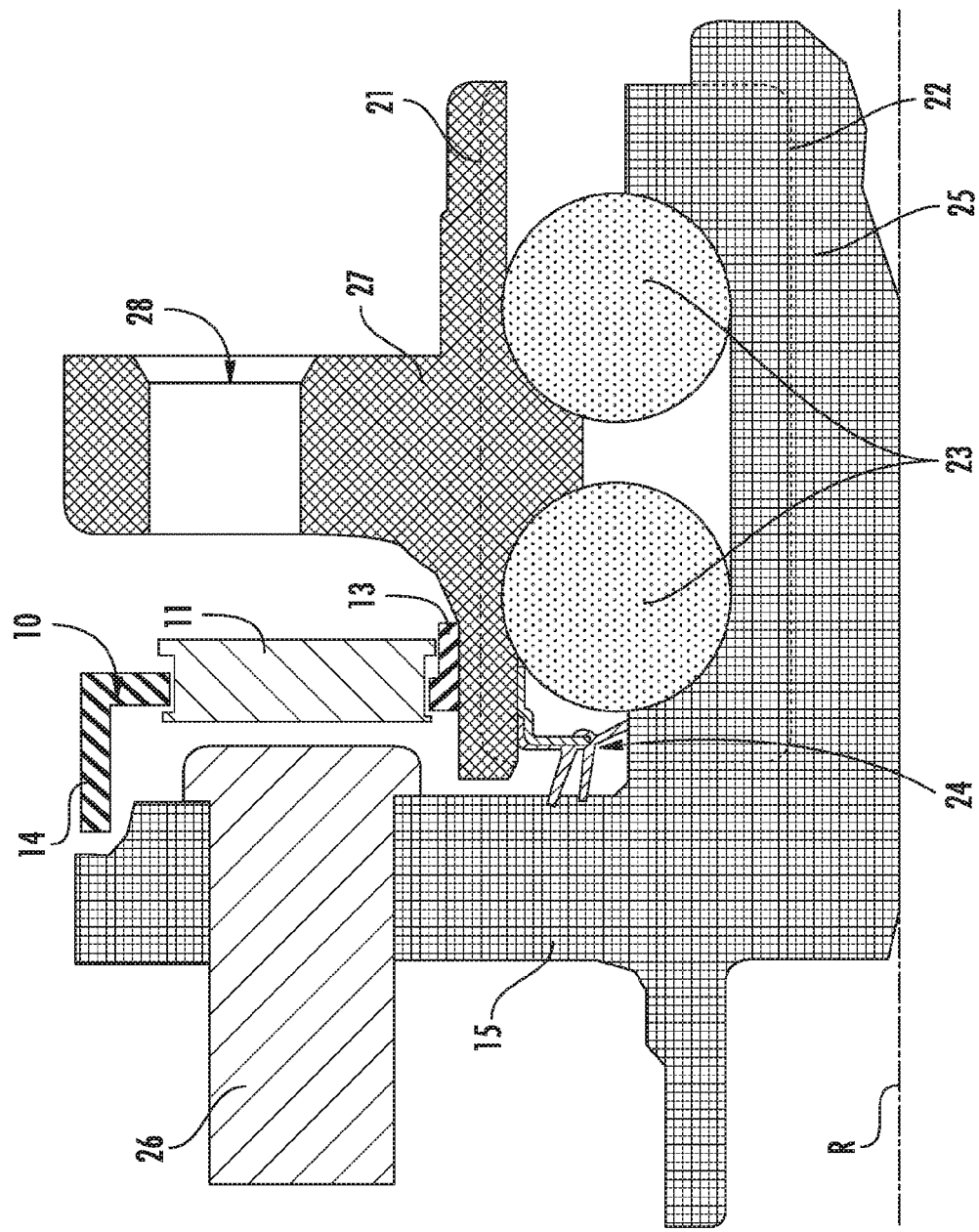
FIG. 1 a wheel bearing unit in an angular contact ball bearing design in a longitudinal section, FIG. 2 a two-part cover element with a closing, round opening, FIG. 3 the cover element from FIG. 2 with uncovered opening in an intermediate installation step.

FIG. 1 shows a wheel bearing in a wheel bearing unit, wherein the support itself is constructed as an angular contact ball bearing. The pre-tensioning of the wheel support is maintained by means of a roller riveted flange of the wheel hub 25, the inner ring 22, which also could have a two-part design, and the two rows of roller bodies 23, as well as the outer ring 27. The outer ring 27 has additional fastener openings 28 that are formed on a fastener flange provided for mounting on the wheel carrier.

The wheel hub 25 has, axially on the wheel side, a wheel flange 15 in whose fastener openings, bolts 26 are inserted. These bolts 26 can be used for mounting a wheel rim that is not shown. The bolts 26 have, on the vehicle side, a head that cannot be moved into the fastener opening due to the positive-locking connection, but instead guarantees an axial support relative to the wheel flange 15.

The sealing of the rolling space with the rows of roller bodies 23 of the wheel bearing unit is realized by the main seal 24 that is constructed as a carrier plate with an elastomer, wherein the elastomer has two axial sealing lips and one radial sealing lip. The gap formed by the outer ring 27 and the wheel flange 15 is further sealed by the cover element 10 in that, the radially outer cylindrical end piece 14 forms, together with the radial end of the wheel flange 15, a labyrinth seal. To this end, the wheel flange 15 has a recess in which the end piece 14 is partially enclosed.

The bolts 26 can be installed and removed without additional means by removing the cap 11 to create space for the installation or removal. The cover 10 remains on the outer ring 27. The fastening flange with the fastener holes 28 does not have a ring shape, so that the bolts 26 can also be removed with their entire length from the opening that can be closed with the cap 11.

One preferred possibility for fastening the cover element 10 on the outer ring 27 provides a cylindrical fastener area 13 that can be moved onto the outer surface of the outer ring with an interference fit.

Figure 2:
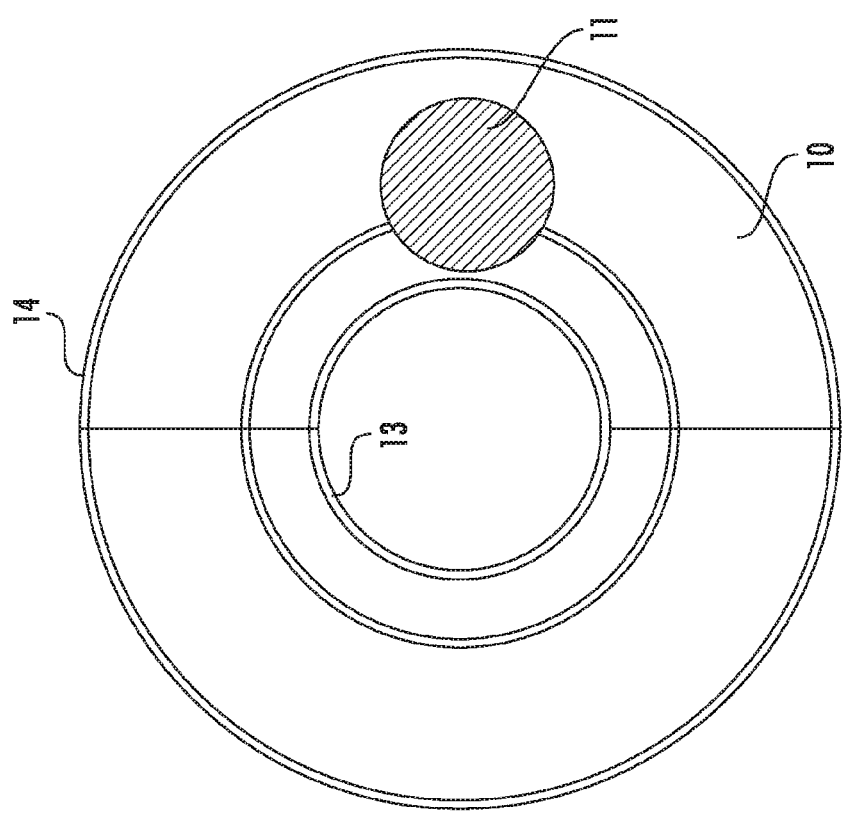

FIG. 2 shows the cover element 10, wherein it can be seen that this can be divided into two halves of equal size, wherein the half on the right has the opening with the cap 11.

The reference symbols are used uniformly in the description of the figures, wherein the fastening area 13 and also the cylindrical end piece 14 in FIG. 2 are shown accordingly.

The cap 11 can be provided by a corresponding shape for engagement in the opening 12 or can be moved into the opening 12 due to its material elasticity, wherein the opening 12 can be sealed additionally. Conceivable is, for example, an essentially conical shape of the cap 11 that leads to a blockage of the essentially round cap 11 in the opening 12. Alternatively, the cap 11 could also have a cylindrical design, wherein the outer side of the cylinder can be loaded elastically by the border of the opening and is also held in the opening 12 by this arrangement.

Figure 3:
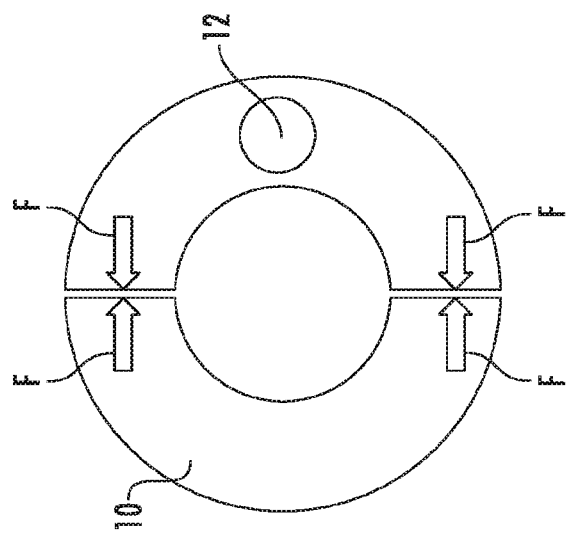

The cover 10 can be made from two parts, as shown in FIG. 3, in that a fastening force F is applied. In this way, the cover element 10 can also be attached at a later time to a completely installed wheel bearing unit, wherein, by means of the fastening mechanism, the interference fit of the fastening area 13 is also pre-defined. The fastening mechanism can be, for example, a snap-on mechanism, an adhesive bond, or also alternative methods for connecting components.

It is clear that a cap 11 or the like is also not absolutely necessary in many cases to cover the opening 12 if the opening 12 is placed for the installation of the cover element 10 such that it is exposed to no or only very little water or foreign particles.

In summary, the invention relates to a wheel bearing unit with a cover element that can be used as a pre-seal to a main seal and includes the fasteners of the wheel flange. An excellent sealing effect was previously favored, which resulted in disadvantageous installation and removal. The invention seeks to eliminate this disadvantage. Therefore, one or more openings are proposed that are formed in the cover. The opening or openings allow the simple removal or installation of the fasteners on the wheel flange and can also be advantageously closed, which makes possible both the sealing effect and also simple removal and installation.

F Fastening force
10 Cover
11 Cap
13 Fastening area
14 End piece
15 Wheel flange
21 Hardened area
22 Inner ring
23 Rows of roller bodies
24 Seal with rubbing contact sealing lip
26 Wheel bolt
27 Outer ring
28 Fastener holes

The invention claimed is:

1. A wheel bearing unit comprising a wheel hub having a wheel flange, a cover that covers a side of the wheel flange facing away from a wheel, the cover is fixed indirectly or directly on an outer ring of the wheel bearing unit and forms, together with the wheel flange, a labyrinth seal, the cover has at least one opening through which a fastening element is guidable through the cover for installation on or removal from the wheel flange.

2. The wheel bearing unit according to claim 1, wherein the opening is closable by a cover element.

3. The wheel bearing unit of claim 2, wherein the cover element is a cap.

4. The wheel bearing unit according to claim 1, wherein the labyrinth seal forms a pre-seal with respect to a seal in the bearing unit with at least one rubbing contact sealing lip.

5. The wheel bearing unit according to claim 1, wherein the cover has a one-part, two-part, or multiple-part design.

6. The wheel bearing unit according to claim 1, wherein several openings that are closable are formed on the cover.

* * * * *